No. 737,415. PATENTED AUG. 25, 1903.
J. P. KEANE.
FILTERING APPARATUS.
APPLICATION FILED FEB. 7, 1902.
NO MODEL.

Witnesses.
Lloyd T. Brunton.
Chs. Hobart Jones.

Inventor.
James P. Keane
By L. M. Hosea
atty.

THE NORRIS PETERS CO., PHOTO-LITHO., WASHINGTON, D. C.

No. 737,415.

Patented August 25, 1903.

UNITED STATES PATENT OFFICE.

JAMES P. KEANE, OF CINCINNATI, OHIO, ASSIGNOR OF ONE-HALF TO EDWARD N. ROTH, OF CINCINNATI, OHIO.

FILTERING APPARATUS.

SPECIFICATION forming part of Letters Patent No. 737,415, dated August 25, 1903.

Application filed February 7, 1902. Serial No. 92,963. (No model.)

*To all whom it may concern:*

Be it known that I, JAMES P. KEANE, a citizen of the United States, residing at Cincinnati, in the county of Hamilton and State of Ohio, have invented new and useful Improvements in Filtering Apparatus, of which the following is a specification.

My invention relates to filtering apparatus designed, primarily, to filter and purify the water-service of public and private buildings, &c., its object being to provide an improved apparatus adapted to the continuous filtration of a water-supply of the character indicated which shall be simple in construction, efficient in operation, and be readily self-cleansing from time to time.

To these ends the invention consists in the improved apparatus hereinafter more particularly described and illustrated, whereby the desired results above indicated are accomplished.

My invention is illustrated in the accompanying drawings, in which—

Figure 1:
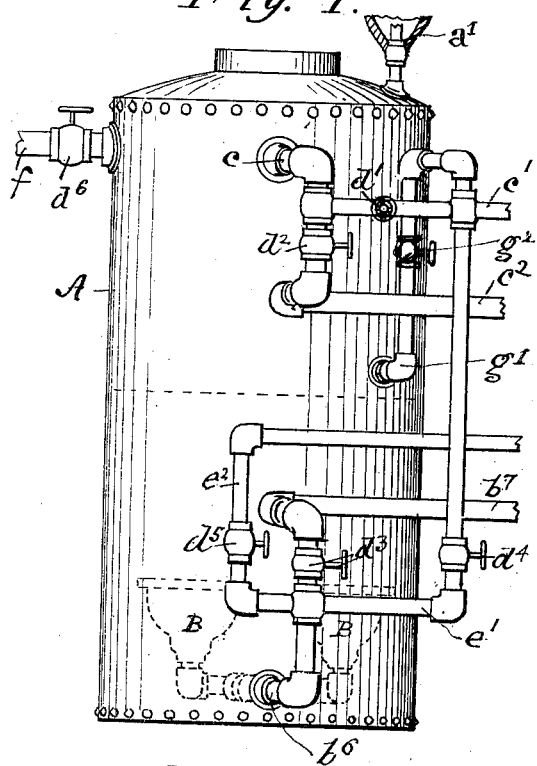
Figure 2:
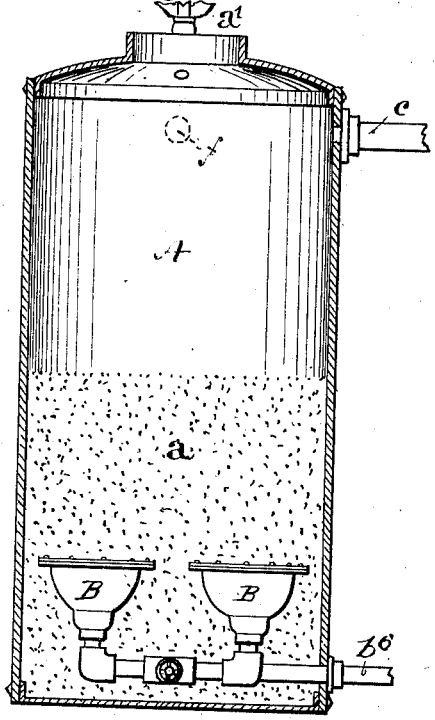
Figure 3:
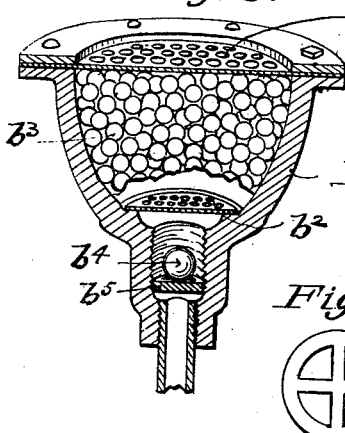
Figure 4:
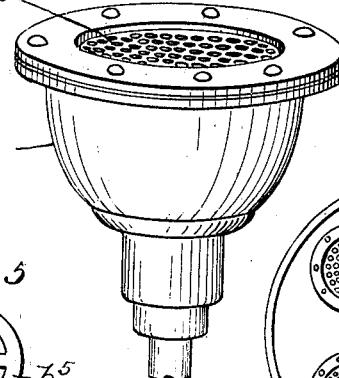
Figure 5:
Figure 6:
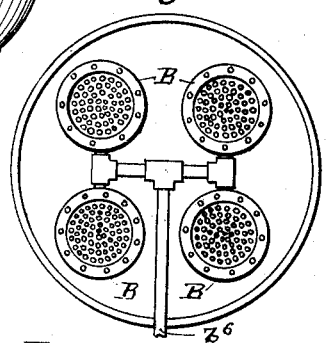

Figure 1 is a side elevation of my improved filter complete; Fig. 2, an axial section approximately in the same line of vision as Fig. 1. Figs. 3 and 4 are an axial section and external perspective elevation, respectively, of one of the "strainers;" Fig. 5, the grating, detached, used in each strainer; and Fig. 6 a plan view of the four strainers used in the apparatus here illustrated, showing their pipe connections.

Referring now to the drawings, A designates a cylindrical tank of convenient dimensions containing at or near the bottom one or more strainers B, with pipe connections, more fully hereinafter described, for the passage of water. The lower portion of the tank is filled with clean sand or other suitable filtering material, indicated by the detached penmarks and designated in the mass by the letter $a$ and filling approximately the lower half of the tank. Rising within the tank A near the bottom are (in the apparatus here illustrated) four cup-shaped strainers B, the particular construction of which is illustrated in Figs. 3 and 4. A perforated plate $b'$ is secured across the top. A similar but smaller perforated plate $b^2$ is loosely laid across the bottom opening, and the space between the two is filled in with comminuted filtering material $b^3$ of about the character of shot, while in an enlargement of the aperture below a metallic ball $b^4$ rests normally upon a grating $b^5$, the office of the ball being that of a striker merely when the current of water is reversed to strike against the loose plate $b^2$, and thus agitate the shot or material $b^3$ to dislodge foreign matter. The strainers B are set upon distributing branches of a pipe $b^6$, entering the tank A near the bottom.

Near the top of the tank A is an admission-pipe $c$, supplied by either of two connecting branches $c'$ or $c^2$, the former being connected to the ordinary pressure-mains of the city and the latter to a pump (not shown) for use when city pressure is not available. Valves $d'$ and $d^2$ govern these branches, respectively. The exit-pipe $b^6$, leading from the strainers, connects normally to the house-supply pipe $b^7$, governed by a valve $d^3$, but for flushing or cleansing purposes also connects by a branch $e'$, governed by a valve $d^4$, with the city-service pipe $c'$ and by a similar branch $e^2$, governed by a valve $d^5$, with the pump-service pipe. A flushing-outlet $f$, governed by a valve $d^6$, is provided at or near the top of the tank, and an air-pressure-equalizing chamber $a'$ (partially shown in Fig. 1) may be attached at the top of the tank to equalize the variations of pressure and produce a uniform flow of water through the tank.

The mode of operation is as follows: In normal use for filtering the water is admitted through the pipe $c$ from the city service $c'$ or pump service $c^2$ and passes downward within the tank through the filtering-bed $a$ to and through the strainers B to the house-supply pipe $b^7$. In its downward passage through the filtering material $a$ the water is deprived of the foreign matter held in suspension and is further screened in the strainers B. The greater part of the suspended mud and sediment is naturally filtered out in the upper strata of the filtering material $a$, where it forms eventually a crust, which protects the lower portion, while the downward current tends to compact the general mass, all of which favors a thorough filtering action.

When necessary to cleanse the filter, the valves $d'$, $d^2$, and $d^3$ are closed and $d^4$ (or $d^5$) and $d^6$ opened. The course of the water through the filter-tank is reversed and now passes upward through the strainers B, causing the balls $b^4$ to lift and strike against the plate $b^2$ and agitate the masses $b^3$, and passes thence upward through the filtering-bed $a$, "boiling" up through the material, as in the case of a natural spring, breaking up the top crust and by attrition of particles thoroughly cleansing the same, and the water and foreign matter thence pass off through the outlet $f$. In connection with this operation I also employ a water-jet, entering just above the normal level of the filtering-bed $a$ by a pipe $g'$, governed by a valve $g^2$. As the water flows upward through the filter-bed it raises the entire mass, with its crust, to or above the entrance of the jet-pipe $g'$, and the jet discharging horizontally inward assists to break up the crust and cleanse the particles by attrition. One or more suitably-disposed manheads (not shown) are formed in the tank A to give access to the interior.

I have not hereinbefore described particularly the material of the filter-bed $a$. I have discovered, however, that crushed glass, in connection with or without a minor proportion of sharp sand forms, a filtering mass superior to anything of which I have knowledge adapted to use in filters of this character. For a like reason I employ the same material, but of coarser texture, as the filling $b^3$ in the strainers B. This material neither sticks nor corrodes, due, as I believe, to the hard and smooth surfaces of fracture and to the irregular form and sharp cutting edges of said surfaces. With a filter thus constructed and a filtering-bed thus composed no chemical element is required for coagulation.

I claim as my invention and desire to secure by Letters Patent of the United States—

1. In a filtering apparatus of the character indicated, the combination of a tank; a granular filter-bed therein; a strainer submerged in the granular bed and provided with perforated plates; one of said plates being loosely placed, a bed of filtering material in the strainer between said plates; an outlet-pipe leading from the strainer; an overflow-pipe leading from the tank above the filter-bed thereof; and a ball in the strainer below the lower perforated pipe, the chamber containing the ball being of relatively larger diameter than the ball and said ball adapted to be acted on by the reverse flow of water to strike percussive blows against the loose strainer-plate to agitate the filter-bed of the strainer and allow the water to cleanse the bed.

2. In a filtering apparatus the combination of a tank; a granular filter-bed therein; a water-inlet above the bed; a strainer submerged in the bed and provided with foraminous, spaced plates, one of said plates being loosely seated, said strainer containing a granular filtering material; a knocker below the loose plate of the strainer, said knocker being contained within a relatively enlarged chamber and adapted to strike percussive blows against said plate to dislodge the particles of filtering material; and a jet-pipe entering the tank substantially in the horizontal plane of the upper surface of the filter-bed of said tank, substantially as described.

In testimony whereof I have hereunto set my hand in presence of two subscribing witnesses.

JAMES P. KEANE.

Witnesses:
LLOYD T. BRUNSON,
CHAS. HERBERT JONES.